United States Patent
Meyer et al.

(10) Patent No.: US 8,112,165 B2
(45) Date of Patent: *Feb. 7, 2012

(54) METHOD FOR EVALUATING, AN AUTOMATION SYSTEM AND A CONTROLLER

(75) Inventors: Mikael Meyer, Lund (SE); Thomas Pauly, Vasteras (SE)

(73) Assignee: ABB AB (SE)

( * ) Notice: Subject to any disclaimer, the term of this patent is extended or adjusted under 35 U.S.C. 154(b) by 747 days.

This patent is subject to a terminal disclaimer.

(21) Appl. No.: 12/202,888

(22) Filed: Sep. 2, 2008

(65) Prior Publication Data

US 2008/0319555 A1    Dec. 25, 2008

Related U.S. Application Data

(63) Continuation of application No. PCT/SE2007/000189, filed on Feb. 28, 2007.

(30) Foreign Application Priority Data

Mar. 2, 2006    (SE) ...................................... 0600447

(51) Int. Cl.
*G05B 19/18* (2006.01)
*G05B 11/01* (2006.01)
*G05B 9/02* (2006.01)
*G05B 19/42* (2006.01)
*G06F 11/00* (2006.01)
*G06F 9/44* (2006.01)
*G06F 9/445* (2006.01)

(52) U.S. Cl. .......... 700/87; 717/168; 717/169; 717/170; 717/173; 717/174

(58) Field of Classification Search ................ 700/4, 11, 700/79, 81, 87; 717/168, 169, 170, 173, 717/174; 714/11, 32
See application file for complete search history.

(56) References Cited

U.S. PATENT DOCUMENTS

| 5,491,625 A | 2/1996 | Pressnall et al. |
| 6,684,396 B1 * | 1/2004 | Brittain et al. ................ 717/168 |

(Continued)

FOREIGN PATENT DOCUMENTS

EP    0366581 A2    5/1990

(Continued)

OTHER PUBLICATIONS

Hoffman; "A Taxonomy for Test Oracles (90 minute presentation)"; Quality Weekly 1998 Proposal; Jan. 16, 1998; 4 pages.

(Continued)

*Primary Examiner* — Ronald Hartman, Jr.
(74) *Attorney, Agent, or Firm* — St. Onge Steward Johnston & Reens LLC

(57) ABSTRACT

The invention relates to a method for evaluating an application for controlling a process within an automation system. The application is stored within a controller, and at least two versions of it are present within the controller. The method comprises the steps of: inputting to the different versions of the application an input signal obtained from the process; executing, in the controller, tasks based on this input signal for the different versions; generating a report comprising comparisons of the outputs from the different versions of the application; and evaluating, based on the generated report, the version(s) not used for controlling the process. An improved way of revising an automation system is thereby achieved. The invention also relates to such controller and an automation system.

20 Claims, 2 Drawing Sheets

U.S. PATENT DOCUMENTS

| | | |
|---|---|---|
| 6,788,980 B1 | 9/2004 | Johnson |
| 6,951,017 B1 | 9/2005 | Dalton |
| 6,986,132 B1 | 1/2006 | Schwabe |
| 7,124,401 B2 * | 10/2006 | Muller et al. .................. 717/124 |
| 7,305,659 B2 * | 12/2007 | Muller et al. .................. 717/127 |
| 7,536,590 B2 * | 5/2009 | Okeda et al. .................... 714/11 |
| 7,711,922 B2 * | 5/2010 | Jerding et al. ................ 711/170 |
| 7,743,224 B2 * | 6/2010 | Wang ............................. 711/154 |
| 7,822,963 B2 * | 10/2010 | Willems ............................ 713/2 |
| 2002/0129352 A1 | 9/2002 | Brodersen et al. |
| 2003/0188303 A1 * | 10/2003 | Barman et al. ................. 717/170 |
| 2004/0210885 A1 * | 10/2004 | Wang et al. .................... 717/158 |
| 2005/0257215 A1 * | 11/2005 | Denby et al. ................... 717/172 |
| 2007/0261052 A1 * | 11/2007 | Bale et al. ...................... 717/174 |
| 2008/0109647 A1 * | 5/2008 | Gavens et al. ..................... 713/2 |
| 2008/0109798 A1 * | 5/2008 | Gavens et al. ................. 717/168 |
| 2009/0222513 A1 * | 9/2009 | Sallberg ........................ 709/203 |
| 2010/0131939 A1 * | 5/2010 | Hieb et al. ..................... 717/169 |

FOREIGN PATENT DOCUMENTS

| | | |
|---|---|---|
| WO | 0077583 A1 | 12/2000 |
| WO | 03027850 A2 | 4/2003 |

OTHER PUBLICATIONS

Supplementary European Search Report; Application No. EP 07 70 9392; May 10, 2010 (Mailing Date: May 18, 2010); 10 pages.

International Preliminary Report on Patentability and Written Opinion of the International Searching Authority; PCT/SE2007/000189; Sep. 2, 2008; 6 pages.

International Search Report, Jun. 19, 2007, 4 Pages.

* cited by examiner

METHOD FOR EVALUATING, AN AUTOMATION SYSTEM AND A CONTROLLER

CROSS-REFERENCE TO RELATED APPLICATIONS

The present application is a continuation of pending International patent application PCT/SE2007/000189 filed on Feb. 28, 2007 which designates the United States and claims priority from Swedish patent application 0600447-7 filed on Mar. 2, 2006, the content of which is incorporated herein by reference.

FIELD OF THE INVENTION

The invention relates to the field of automation, and in particular to a method for evaluating an application for controlling a process within an automation system as defined in the preamble of claim 1, to an automation system as defined in the preamble of claim 13, and to a controller as defined in the preamble of claim 19.

BACKGROUND OF THE INVENTION

Automatic control or automation is very important within industrial production, for example in order to eliminate monotonous tasks and lessen hazardous elements in a production line. In general automation also increases the efficiency as well as the quality of a process and is an excellent means to meet today's demands for non-environmental influence and economical production.

The different process sections in a typical plant are linked in some way, either by process flow or by energy flow. These circumstances bring about the drawback that shutting down one process section quickly causes other shut downs of other process sections located up- and downstream and eventually a shut down of the whole plant. It is very important to have constant availability to the plant using such process control systems since a standstill of the production is quite expensive. Starting up a plant is generally a time-consuming process, often requiring several hours or even days. A stop in one section thus causes production losses, which can be in the multimillion-dollar range. Further, a stop and restart also causes excessive wear on process equipment and catalysts. This in turn entails maintenance work more frequently, servicing and catalyst replacement, thus adding to the long-term cost of operation.

It is often necessary to make changes to the way the processes are controlled in order to improve equipment utilization, minimize defects and off-spec quality, optimize energy consumption and so on. Regular updates of system software are thus necessary for improving existing routines as well as for correcting shortcomings of the routines used. The control programs controlling the processes are therefore subject to continuous development in order to meet the changing demands. In view of the high costs associated with a production stop such changes of the control programs are normally performed on-line, but to make a change on-line entails a risk of upsetting the process being changed and care has to be taken when upgrading the process applications.

More specifically, when such updates are to be made, the version presently being used is overwritten by the new, upgraded version. This can bring about serious problems should the new version not be adequately downloaded, if the new version contains bugs or if it is non-functioning or if it contains unforeseeable incompatibilities with the system, for example leading to disturbances or instabilities in the controlled process. Should a need to revert to the old version arise, this previous code has to be downloaded again. The production could then possibly halt until the old version is up and running again. As mentioned, such interruptions in production are very expensive, or could even, depending on the industry in question, be dangerous. It is difficult to foresee whether a new version of a control application would be functioning in a real environment, and if it is not functioning, it is very difficult to know which part of the application is not functioning satisfactory.

One approach to address these problems is described in the published patent publication U.S. Pat. No. 5,491,625. The approach presented in this patent publication uses two controllers that are tightly coupled to each other, for example a primary and a redundant controller. One of the controllers run the current version of the control program and the other one executes the new version. Both controllers read values from the process, but outputs from the second controller are blocked such that only outputs from the first controller can affect the process. A user can compare the results of the two controllers and thus determine if the new version of the control program behaves in a correct way, before he or she switches over to let the new version actively control the process. A difficulty of this state of the art solution is that it requires two controllers, which increases the cost. A further difficulty is that it requires some kind of synchronization and arbitration mechanism between the two controllers, in order to synchronize execution cycles, arbitrate between the process outputs from the two controllers, determine any differences in results and generate a difference report. The synchronization must be very tight to ensure that both controllers for each execution cycle uses process input values relating to identical samples of process inputs and external variables. This further increases the complexity and cost of the proposed solution. A yet further difficulty is that if the two controllers are a primary and a redundant controller, the redundant controller is used to execute the new version of the control program and therefore does not function as a back-up for the primary controller for the duration of the evaluation.

It would thus be desirable to provide an improved way of changing or upgrading versions of a control program or an application within a system, and to make such change or upgrading without disturbances in the production.

SUMMARY OF THE INVENTION

It is therefore an object of the present invention to provide a method for ensuring that a new version of an application to be installed is functioning, and importantly, functioning in a real environment and under actual conditions, resulting in a smooth and safe change-over from one version to another, thereby alleviating the shortcomings of the prior art.

A further object is to enable a software revision without interrupting or even disturbing an ongoing execution of controller applications.

A further yet object is to provide a way to assist an operator in minimizing the risks involved when making a change to a control program. This is accomplished by making the operator aware of differences between an existing and a new version of a control application, and also making the operator aware of potential step changes in process output possibly caused by the new version.

A further object is to provide a method to evaluate a new version of a control program that can be implemented using only one controller. Yet another object is to provide this method such that when it is used with a pair of primary and a redundant controller, the redundant controller can function as a backup for the primary controller also during evaluation.

These objects, among others, are achieved by a method as claimed in claim 1, by a system as claimed in claim 13, and by a controller as claimed in claim 19.

In accordance with the present invention a method for evaluating an application for controlling a process within an automation system is provided. Two or more versions of the application are stored within a controller, such as a process controller or a programmable logic controller. The method comprises the steps of inputting to all of the different versions of the application which versions reside within the same controller and of which one version is controlling said process, an input signal obtained from the process; executing, in the controller, the same tasks based on said input signal for the different versions of the application; generating a report comprising comparisons of the outputs from the different versions of the application; and evaluating, based on the generated report, the version(s) not used for controlling the process. In accordance with the invention, tasks are executed for all versions in the controller based on the same input signal, but only the output signal obtained from the version currently controlling the process is output as the required output for controlling the process, the output signals obtained from all other versions are made available for evaluation, for example by an operator. By means of the invention a new upgraded version of an application can be executed concurrently with a currently used version and evaluated under true production circumstances utilising real input signals, and thereby eliminating the risk of shutdowns of the production. Further, by means of the invention it is ensured that purposeful comparisons are made as well as enabling the user to evaluate a version being currently under development before using it for controlling the processes.

In accordance with an embodiment of the invention the method comprises additional steps if the step of evaluating shows that the new version is functioning properly. Namely the steps of: hindering the outputs from the version currently controlling the process from being used to control the process, and putting a version not controlling the process to actively control the process. Alternatively, if the step of evaluating shows that the new version is not functioning properly the method comprises the further step of outputting from the version currently controlling the process an output signal obtained during said execution for controlling said process. The user also has the possibility to change to a new version (after evaluation) and if the version still does not function as expected, the user may revert to the old version. The user is thus able to evaluate a new version of an application and take appropriate actions based on the evaluation.

In accordance with yet another embodiment of the invention the execution of the tasks is performed in sequence for the different versions, or in an alternative embodiment in a quasi-parallel manner. This feature provides a flexible way to execute the tasks, both ways ensuring that the same tasks are performed for the different versions and thus ensuring that the comparisons being made are relevant.

In accordance with yet a further embodiment of the invention, the step of generating a report comprises comparing the outputs from all of the at least two versions and establishing differences between the outputs. A user is thereby able to easily compare the different versions.

In accordance with another embodiment of the invention, the method further comprises the step of presenting found differences to a user. This facilitates the evaluation and such presentation can be accomplished in any desired manner, such as for example in the form of graphs, numbers or diagrams.

In accordance with still another embodiment of the invention, the evaluation of the different versions is performed in order to establish the functionality of a new version of the application under real process circumstances. Other applications of the invention are also conceivable, such as tracing faults or the like. The invention thus provides a general method for evaluation applicable for different purposes.

The invention is also related to an automation system and a controller, whereby advantages corresponding to the above described are achieved.

DETAILED DESCRIPTION OF THE INVENTION

Figure 1:
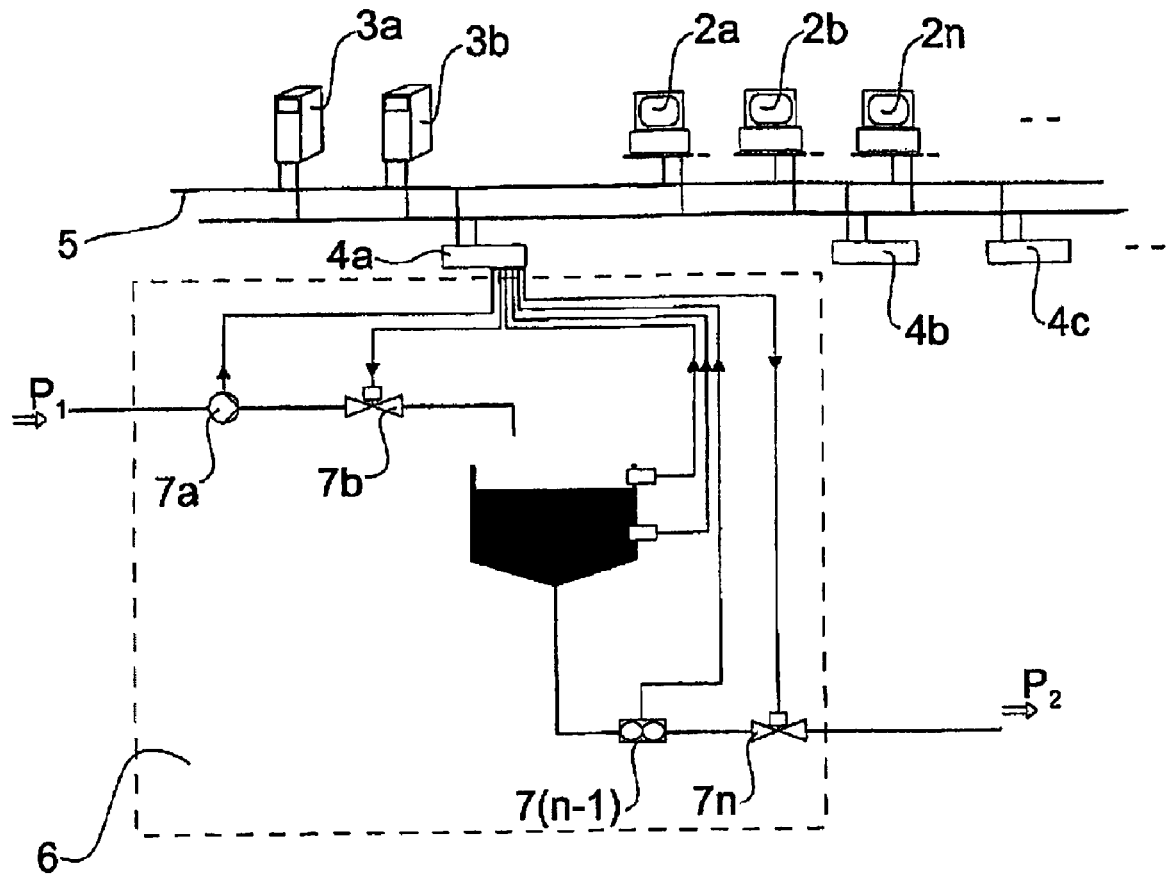
FIG. 1 illustrates schematically an automation system.

With reference to FIG. 1 the layout of a typical process control system is shown. Process control systems 1 typically consist of operator and engineering workstations 2a, 2b, . . . , 2n, a number of servers 3a, 3b for performing various kinds of system functionality and controllers 4a, 4b, . . . 4n performing the actual automatic process control functions. The different parts are interconnected by means of a communication network 5. The controllers 4a, 4b, . . . , 4n control a respective process section or function; in the figure the controller 4a is shown to control a process section 6 comprising a tank and a number of valves, actuators and sensors. Each process section or function, such as the process section 6, may be dependent upon an upstream and/or a downstream process section or function (not shown), as is indicated by the arrows $P_1$ and $P_2$.

Figure 2:
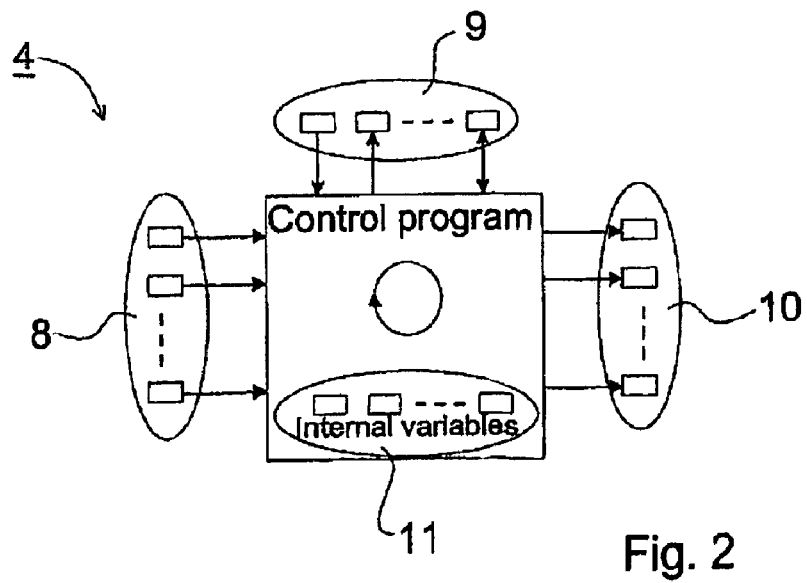
FIG. 2 illustrates a typical controller used within a system shown in FIG. 1.

A general principle for the execution of control programs in a controller is shown in FIG. 2. The controllers are typically programmable by means of some form of domain specific high level programming language, such as for example IEC 61131-3. In the following specific reference is made to controllers, such as a process controller or a programmable logic controller (PLC) having 61131-3 applications, but it is understood that the principles of the invention could be implemented and used more generally and that any suitable controller may be used. Further, in the following the terms application, application program and control program are used interchangeably.

A controller 4 receives process inputs 8 as well as external variables 9. An input arrangement connects the controller 4 to sensors (for example 7a of FIG. 1) used in different process sections, for example temperature indicators, vibration sensors, position sensors, limit switches, flow meters, optical sensors, switching valves or relays. The controller 4 further comprises internal variables 11 and external variables 9. Internal variables are used to hold values that represent the state of the control program between scan cycles, such as the derivative and integration components of a PID function, or the elapsed time of a timer, or the step number of a sequence. External variables 9 are used in order to exchange information with other control programs, which may be run in the same controller 4 or in other controllers connected to the control system network 5. Examples of such information exchange are interlocking signals, set points, and feedback and feed forward signals. The controller 4 further comprises an output section 10 for delivering process outputs to actuators (for example 7b, ..., 7n of FIG. 1).

The controller 4 is programmed to react to input signals and a skilled engineer having knowledge of the specific industry in question usually develop the programs used by a controller. The programs in a controller are generally written in a special application, or application program, which is downloaded to the controller and stored therein. As mentioned, controllers conventionally use the IEC (International Electrotechnical Commission) 61131-3 programming language standard, which defines five controller programming language standards: ladder logic, sequential function chart (SFC), function block diagram, structured text, and instruction list.

A control program or application cyclically reads the values of process inputs 8 and external variables 9, performs calculations based on these values and also on the values of internal variables 11, and generates as a result values to process outputs 10 and also to external variables 9. Each such execution is called a scan cycle. The controller 4 comprises a central processing unit (CPU) executing the instructions of the control programs, and a memory for storing instructions and data, input/output units for enabling communication with the processes and a communication interface for enabling communication with other controllers and units. The CPU is also responsible for the communication with other devices and the execution of the control programs.

In accordance with the invention a method is provided for improving the changing of a control program within a controller, without running the risk of using a faulty control program and thus risk causing disturbances in the process. The inventive method can be seen as comprising three phases: load, evaluate, go.

When a new version $V_{new}$ of a control program, for example a 61131-3 control program or application, has been created it is tested in a simulation using simulated inputs. Firstly, in the loading phase, at least one operator workstation is reconfigured with process graphics associated with the new version $V_{new}$ of the control program. There is of course at least one other operator workstation being configured to work against the current version, i.e. the version controlling the processes and hereinafter called the old version or current version interchangeably. The new version $V_{new}$ is downloaded to the same controller as the one comprising the old version $V_{old}$ currently controlling the process.

The second phase, the evaluation, comprises starting the new version $V_{new}$ of the control program in an evaluation mode. The controller now executes both versions, i.e. both the current version $V_{old}$ and the new version $V_{new}$. Both versions receive the same process inputs 8, and also the same external variables 9, and execute the same tasks. Both versions read the same sampled values of process inputs and external variables. This can be accomplished by having the input sampling done separately from and before the execution of the control programs. While having results from both versions, the outputs from the new version $V_{new}$ are isolated from affecting the process outputs 10 and external variables 9, i.e. they are not used for controlling the process and do therefore not in any way affect the ongoing process operations. The outputs from the current version $V_{old}$ are still used for controlling the process.

It is possible to run even further versions of an application simultaneously, but two versions, namely the current version and the new, upgraded version to replace it, is the normally occurring situation. Only two different versions are described for simplicity of description.

The evaluation phase of the method further comprises generating a report listing the differences, if any, between the values of the internal variables, external variables, outputs and sequence states of the current and the new version. This report is preferably dynamic, thereby enabling the operator to see if and how the differences change over time. For example, a certain variable value, calculated by both versions, can be diverging, converging or remain at a same difference. This report can for example be accomplished as a difference report that is generated automatically, at regular intervals, or at the request by the operator. The report is then preferably sent to the engineering workstation for evaluation. The operator or user may use these reports in order to determine whether any of the existing differences would cause a bump or step change in the process outputs if the new version $V_{new}$ should be taken into use, i.e. if it were to control the process. A bump may for example be caused by a change in control strategy, where the new version is not reading the response from the process that it expects from its control action and integrates the deviation and drive the output to saturation. When the user is convinced that there are no differences that will cause bumps, that is, no transients, upsets or the like, the evaluation phase of the method is completed.

If the evaluation shows that the new version does not perform satisfactorily or as expected, the user can remove the new version from the controller and let the old version continue controlling the process.

If on the other hand the evaluation shows that the new version performs satisfactorily and as expected, the user enters the last part of the method, the "go"-part, by switching over to the new version $V_{new}$ to let the new version actively control the process. When doing this all outputs from the previously controlling version are isolated from the process, i.e. they are no more used for controlling the process and do no longer affect the ongoing process operations. Instead, the outputs for controlling the process are taken from the new version, thus now being the current version.

The comparison continues, now with the new version actively controlling the process and the old version performing the same calculations but not affecting the process. If this continued evaluation shows that the new versions is still performing satisfactorily and as expected the user removes the old version from the controller and the "go" phase ends. If on the other hand it turns out that there is a problem with the new version, the user can switch back to the old version and remove the new version from the controller.

The most crucial values of an application or control program are the values that affect the surroundings of the application and in particular the process, i.e. values of variables connected to I/O output channels, conditions to alarm objects, values of variables connected to access variables (that is, communication variables visible and accessible from other applications), and state of SFC-steps. However, it is understood that any values in the applications could be compared. The comparison of values from different versions of an application can also be used in fault tracing.

When executing both versions in the same controller it is important that values from the same scan cycle are used in the comparisons. Thereby it is ensured that the comparison is accurate and the values actually comparable, i.e. are from the same scan cycle.

The comparisons are preferably made in the controller, whereby the communication load between the controller and an operator's work station, such as a PC or the like, will be significantly less than if the values should be compared in the PC.

When differences have been found in the controller they should be presented to the user of the system. The values that have been found to differ are packed or coded into communication telegrams or packages, enabling a transmission to a PC on request, or automatically. Should a particularly alarming difference occur it is possible to display it highlighted, for example present it as flashing values or triggering an audible alarm.

In an alternative embodiment of the invention, the different versions are not executed in sequence, i.e. one executed after the other, but in a quasi-parallel manner. This could be accomplished by having an operating system or some other scheduling mechanism allocate CPU time to each version in such a way that both versions complete each scan cycle before any of the versions start a new scan cycle.

Figure 3:
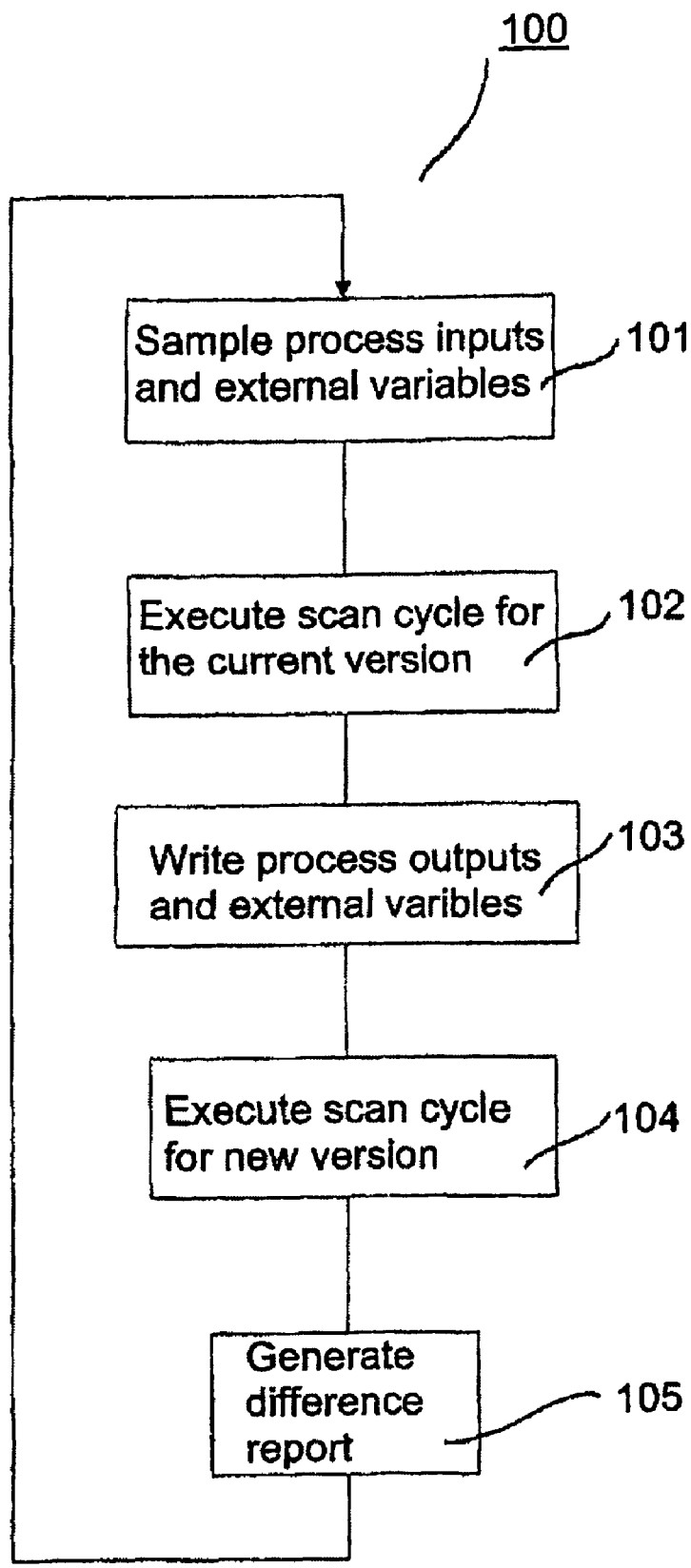
FIG. 3 is a flowchart over some steps included in an embodiment of the method in accordance with the present invention.

In FIG. 3 a summation of some of the steps included in the method according to the present invention is shown in a flowchart 100. The new version of the control program is downloaded to the same controller that is executing the current version. When the download is completed the second version is started in an evaluation mode, in which the two versions are executed in sequence for each scan cycle, for example the current version first, followed by the new version. In the first step of the flow chart 100, step 101, process inputs and external variables are sampled. Both versions read the same samples of process inputs and external variables. This is preferably accomplished by having the input sampling done separately from and before the execution of the control programs. Next, in step 102, a scan cycle is executed for the current version, after which (step 103) the process outputs and external variables are written to a memory location. Hereafter, in step 104, the scan cycle is executed for the new version. Next, in step 105, a difference report is generated, comprising differences in outputs between the two versions.

It is to be understood that all steps are not necessarily included, and that others could be included. Further, the order of some steps could be altered. It could for example be feasible to execute the new version before the current version, or both versions may be executed before the process outputs and external variable are written. In the description two versions of an application have been used for illustrating the invention, but three or more versions could be performed in an alternate embodiment. For example, if there are two different versions, $V_{new\,1}$ and $V_{new\,2}$, one of them intended to replace a current version of an application, all three versions could be run in sequence in a way corresponding to the above described, i.e. the two new versions $V_{new\,1}$, $V_{new\,2}$ and the currently used one $V_{old}$.

In summary, the inventive method provides an improved way to change the version of a control program controlling a process. In accordance with the invention only one controller is required, thereby eliminating the need for a redundant controller and thus lowering the costs. Another advantage obtained by the inventive method and brought about by the use of a single controller is the eliminated requirements for synchronization and arbitration between a currently used controller and a redundant controller. Further yet, since the different versions of the control program are executed in sequence in the same controller and under identical circumstances the behaviour of the different versions can be compared before the new version is deployed. By means of the invention, it is ensured that a new version truly is functioning in a real environment before it is launched, and expensive production stoppages can be avoided. Should a comparison show somehow contrary results, for example the different versions indicating opposite switching operations to be performed, the new version can easily be revised before being finally taken into operation. An improved way of revising an automation system is thereby achieved.

What is claimed is:

1. A method for evaluating an application for controlling a process within an automation system, said application residing within a controller, characterised in that the method comprises the steps of:
inputting to all of at least two different versions of the application, which versions reside within the same controller and of which one version is controlling said process, an input signal obtained from said process,
executing, in the controller, the same tasks based on said input signal for the at least two different versions of the application,
generating a report comprising comparisons of outputs obtained from the execution of the at least two different versions of the application, and
evaluating, based on said generated report, the version(s) not used for controlling the process.

2. The method as claimed in claim 1, wherein if said step of evaluating shows that the new version is functioning properly the method comprises the further steps of:
hindering the outputs from the version currently controlling the process from being used to control the process, and
putting a version not controlling the process to actively control the process.

3. The method as claimed in claim 1, further comprising the step of preventing the outputs from all versions expect the version that is currently controlling the process from affecting the process.

4. The method as claimed in claim 1, wherein if said step of evaluating shows that the new version is not functioning properly the method comprises the further step of:
outputting from the version currently controlling the process an output signal obtained during said execution for controlling said process.

5. The method as claimed in claim 1, wherein said step of executing tasks are performed in sequence for the different versions.

6. The method as claimed in claim 1, wherein said step of executing tasks are performed in a quasi-parallel manner for the different versions.

7. The method as claimed in claim 1, wherein said step of generating a report comprises comparing the outputs from all of the at least two versions and establishing differences between said outputs.

8. The method as claimed in claim 7, wherein said difference report is dynamic.

9. The method as claimed in claim 1, wherein said step of executing at least two versions of the application comprises the steps of:
receiving, by said different versions, the same input signals from an I/O arrangement of said controller and executing the same tasks,
performing, by said different versions, process related calculations, and
using the results from only one of said versions for controlling the process.

10. The method as claimed in claim 1, wherein said method further comprises the step of presenting found differences to a user.

11. The method as claimed in claim 1, wherein said step of generating a report on differences is performed in order to establish the functionality of a new version of the application under real process circumstances.

12. The method as claimed in claim 1, wherein said step of inputting to all of at least two different versions of the application, comprises inputting external variables.

13. An automation system comprising a controller, said controller having stored therein an application for controlling a process within the automation system, characterised in that the system comprises:
- means for inputting to all of at least two different versions of the application, which versions reside within the controller, an input signal obtained from said process,
- means for executing, in the controller, tasks based on said input signal for the at least two different versions of the application in parallel,
- means for generating a report comprising comparisons of outputs obtained from an execution of the at least two different versions of the application, and
- means for evaluating, based on said generated report, the version(s) not used for controlling the process.

14. The automation system as claimed in claim 13, comprising
- means for hindering the outputs from the version currently controlling the process from being used to control the process, and
- means for putting a version not controlling the process to actively control the process.

15. The system as claimed in claim 13, further comprising the means for preventing the outputs from all versions expect the version that is currently controlling the process from affecting the process.

16. The automation system as claimed in claim 13, wherein said versions of an application are arranged to be executed in sequence under real process conditions.

17. The automation system as claimed in claim 13, further comprising means for storing at further memory locations differing variable values.

18. The automation system as claimed in claim 13, further comprising means for presenting found differences to a user.

19. A controller for controlling processes within an automation system, said controller comprising an application and an input/output arrangement, characterised in that said controller comprises:
- at least two different versions of said application, said versions being arranged to receive the same data from said input/output arrangement,
- means for executing the same tasks based on said input signal for the at least two different versions of the application,
- means for generating a report comprising comparisons of outputs from an execution of the at least two different versions of the application, and
- means for evaluating, based on said generated report, the version(s) not used for controlling the process.

20. The controller as claimed in claim 19, wherein said I/O arrangement comprises connections connecting said controller to sensors and actuators located within said automation system and related to processes therein.

* * * * *